(12) United States Patent
Watanabe et al.

(10) Patent No.: US 9,508,992 B2
(45) Date of Patent: Nov. 29, 2016

(54) POSITIVE ELECTRODE FOR NON-AQUEOUS ELECTROLYTE SECONDARY BATTERY, AND NON-AQUEOUS ELECTROLYTE SECONDARY BATTERY

(71) Applicant: PANASONIC CORPORATION, Osaka (JP)

(72) Inventors: Kozo Watanabe, Osaka (JP); Junichi Sugaya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 474 days.

(21) Appl. No.: 14/344,896

(22) PCT Filed: Sep. 28, 2012

(86) PCT No.: PCT/JP2012/006236
§ 371 (c)(1),
(2) Date: Mar. 13, 2014

(87) PCT Pub. No.: WO2013/046711
PCT Pub. Date: Apr. 4, 2013

(65) Prior Publication Data
US 2014/0342230 A1 Nov. 20, 2014

(30) Foreign Application Priority Data
Sep. 28, 2011 (JP) .................. 2011-212090

(51) Int. Cl.
*H01M 4/505* (2010.01)
*H01M 4/525* (2010.01)
(Continued)

(52) U.S. Cl.
CPC ............ *H01M 4/505* (2013.01); *H01M 4/131* (2013.01); *H01M 4/364* (2013.01); *H01M 4/525* (2013.01); *H01M 10/0525* (2013.01); *Y02E 60/122* (2013.01); *Y02T 10/7011* (2013.01)

(58) Field of Classification Search
CPC .... H01M 4/505; H01M 4/525; H01M 4/131; H01M 4/364; H01M 10/0525
USPC .................................................. 429/221, 223
See application file for complete search history.

(56) References Cited

U.S. PATENT DOCUMENTS

| 6,682,850 B1 | 1/2004 | Numata et al. |
| 7,923,400 B2 | 4/2011 | Saito et al. |

(Continued)

FOREIGN PATENT DOCUMENTS

| EP | 1 117 145 A1 | 7/2001 |
| EP | 1 901 374 A1 | 3/2008 |

(Continued)

OTHER PUBLICATIONS

International Search Report issued in International Application No. PCT/JP2012/006236 with Date of mailing Dec. 11, 2012, with English Translation.

*Primary Examiner* — Jayne Mershon
(74) *Attorney, Agent, or Firm* — McDermott Will & Emery LLP (57) ABSTRACT

Disclosed is a positive electrode for a non-aqueous electrolyte secondary battery, including a current collector and a mixture layer attached thereto. The mixture layer includes an active material including particles of a first active material, i.e., a lithium-manganese composite oxide, and particles of a second active material, i.e., a lithium-nickel composite oxide. A proportion of the first active material particles in the active material is 51 vol % to 90 vol %. A volume-based particle size distribution of the first active material particles has a first peak on a larger particle side and a second peak on a smaller particle side. A first particle size $D_1$ corresponding to the first peak is 2.5 to 5 times larger than a second particle size $D_2$ corresponding to the second peak. A volume-based particle size distribution of the second active material particles has a third peak corresponding to a third particle size $D_3$ satisfying $D_1 > D_3 > D_2$.

5 Claims, 4 Drawing Sheets (51) Int. Cl.
  *H01M 4/131* (2010.01)
  *H01M 4/36* (2006.01)
  *H01M 10/0525* (2010.01)

(56) References Cited

U.S. PATENT DOCUMENTS

| | | |
|---|---|---|
| 2004/0110063 A1 | 6/2004 | Uchitomi et al. |
| 2006/0257745 A1 | 11/2006 | Choi et al. |
| 2007/0195125 A1 | 8/2007 | Saito et al. |
| 2008/0070119 A1 | 3/2008 | Miura et al. |
| 2008/0102369 A1* | 5/2008 | Sakata ............... H01M 4/13 429/188 |
| 2010/0019208 A1 | 1/2010 | Choi et al. |
| 2011/0151313 A1 | 6/2011 | Saito et al. |
| 2012/0305835 A1* | 12/2012 | Yamaguchi ........... H01M 4/485 252/182.1 |

FOREIGN PATENT DOCUMENTS

| | | |
|---|---|---|
| JP | 2000-077071 A | 3/2000 |
| JP | 2000-082466 A | 3/2000 |
| JP | 2000-311675 A | 11/2000 |
| JP | 2003-221236 A | 8/2003 |
| JP | 2006-172821 A | 6/2006 |
| JP | 2006-228733 A | 8/2006 |
| JP | 2008-098142 A | 4/2008 |
| WO | 00/13250 A1 | 3/2000 |
| WO | 2006/064342 A2 | 6/2006 |
| WO | WO 2011/099145 * | 8/2011 |

* cited by examiner

POSITIVE ELECTRODE FOR NON-AQUEOUS ELECTROLYTE SECONDARY BATTERY, AND NON-AQUEOUS ELECTROLYTE SECONDARY BATTERY

RELATED APPLICATIONS

This application is the U.S. National Phase under 35 U.S.C. §371 of International Application No. PCT/JP2012/006236, filed on Sep. 28, 2012, which in turn claims the benefit of Japanese Application No. 2011-212090, filed on Sep. 28, 2011, the disclosures of which Applications are incorporated by reference herein.

TECHNICAL FIELD

The present invention relates to a non-aqueous electrolyte secondary battery, and particularly relates to an improvement of a positive electrode for a non-aqueous electrolyte secondary battery.

BACKGROUND ART

Non-aqueous electrolyte secondary batteries have a high energy density. Therefore, they are widely used as the power source for portable electronic devices such as mobile phones and laptop computers.

Among non-aqueous electrolyte secondary batteries, lithium-ion secondary batteries have a high voltage of 3.6 V, and can therefore store the same amount of energy as nickel-metal hydride batteries, although their mass and volume are about 50% and about 20 to 50%, respectively, of those of nickel-metal hydride batteries. Moreover, since lithium-ion secondary batteries exhibit no memory effects, they are suitable as the power source for mobile phones and laptop computers, and hold a large share in the battery market.

A lithium-manganese composite oxide has hitherto been considered for use as a positive electrode active material in non-aqueous electrolyte secondary batteries. Expectations are high for a lithium-manganese composite oxide, due to its low cost, very stable supply of raw materials, and its superior safety at a time of internal short circuit (i.e., heat generation is moderate).

Thus, the following proposals have been made for a technique relating to a lithium-manganese composite oxide.

Patent Literature 1 proposes a technique of using a spinel-type lithium-manganese composite oxide having a particle size distribution with two or more peaks, thereby to increase the density of the positive electrode.

Patent Literature 2 proposes a technique of mixing a lithium-nickel composite oxide with a spinel-type lithium-manganese composite oxide, thereby to suppress elution of manganese from the lithium-manganese composite oxide.

Patent Literature 3 proposes a technique of mixing a lithium-nickel composite oxide and a spinel-type lithium-manganese composite oxide, the former having a large average particle size and the latter having a small average particle size.

CITATION LIST

Patent Literatures

[Patent Literature 1] Japanese Laid-Open Publication No. 2000-82466

[Patent Literature 2] Japanese Laid-Open Publication No. 2000-77071

[Patent Literature 3] Japanese Laid-Open Publication No. 2006-228733

SUMMARY OF INVENTION

Technical Problem

However, when a positive electrode is produced by using a positive electrode active material mainly composed of a lithium-manganese composite oxide, there is difficulty in increasing the density of the positive electrode. That is, a process of producing a positive electrode typically has a step of rolling or pressing a positive electrode mixture layer comprising a positive electrode active material, by using a roll press or the like; and in rolling, if too much pressure is applied to the positive electrode mixture layer, particles of the lithium-manganese composite oxide would break. Then, there would be elution of manganese from active sectional surfaces created in the layer due to the breaking of the particles, causing reduction in charge-discharge characteristics of the battery. Thus, when a positive electrode active material mainly composed of a lithium-manganese composite oxide is used, it is difficult to obtain an increased energy density in the battery that is due to an increased density of the positive electrode, while also maintaining charge-discharge characteristics of the battery.

As in Patent Literature 2, even when a lithium-nickel composite oxide is mixed with a spinel-type lithium-manganese composite oxide for suppressing elution of manganese, the packing ability of the resultant active material mixture comprising the lithium-manganese composite oxide and the lithium-nickel composite oxide will be lower, depending on particle sizes selected for mixing. As a result, interaction between the lithium-manganese composite oxide and the lithium-nickel composite oxide will be insufficient, and the effect of suppressing elution of manganese will be reduced.

In view of the foregoing, an object of the present invention is to realize increase in the density of a positive electrode which includes a lithium-manganese composite oxide, and to also provide a non-aqueous electrolyte secondary battery with excellent charge-discharge characteristics.

Solution to Problem

One aspect of the present invention relates to a positive electrode for a non-aqueous electrolyte secondary battery, the positive electrode comprising: a positive electrode current collector; and a positive electrode mixture layer attached to the positive electrode current collector, the positive electrode mixture layer comprising a positive electrode active material including first active material particles and second active material particles, the first active material being a lithium-manganese composite oxide, the second active material being a lithium-nickel composite oxide, a proportion of the first active material particles included in the positive electrode active material being 51 vol % to 90 vol %, and a volume-based particle size distribution of the first active material particles having a first peak on a larger particle side and a second peak on a smaller particle side, a first particle size $D_1$ corresponding to the first peak on the larger particle side being 2.5 to 5 times larger than a second particle size $D_2$ corresponding to the second peak on the smaller particle side ($2.5 \leq D_1/D_2 \leq 5.0$), and a volume-based particle size distribution of the second active material particles having a third peak corresponding to a third particle size $D_3$ satisfying $D_1 > D_3 > D_2$.

Another aspect of the present invention relates to a non-aqueous electrolyte secondary battery comprising: the positive electrode described above; a negative electrode; and a non-aqueous electrolyte layer interposed between the positive and negative electrodes.

Advantageous Effects of Invention

According to the present invention, when a positive electrode active material mainly composed of a lithium-manganese composite oxide is used, the packing ability of the positive electrode active material in the positive electrode mixture layer can be increased; and moreover, breaking of the active material particles can be suppressed, such breaking being the cause of accelerating elution of manganese from the lithium-manganese composite oxide. As such, the foregoing enables obtaining an increased energy density in a non-aqueous electrolyte secondary battery due to an increased density of the positive electrode, and also, obtaining a non-aqueous electrolyte secondary battery having excellent charge-discharge cycle characteristics.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

A positive electrode for a non-aqueous electrolyte secondary battery of the present invention comprises: a positive electrode current collector; and a positive electrode mixture layer attached thereto.

The positive electrode current collector is, for example, a conductive material in sheet form. Alternatively, as in a coin-type battery, a battery case may serve as both the case and the current collector. The positive electrode mixture layer may be formed on one surface only, or both surfaces, of the current collector in sheet form. The material of the current collector in sheet form can be aluminum, an aluminum alloy, a carbon material, a conductive resin, or the like. Alternatively, a surface of a sheet material may be coated with a conductive material such as carbon.

The positive electrode mixture layer comprises a positive electrode active material. The positive electrode active material includes first active material particles and second active material particles, and may further include third active material particles. However, note that the present invention mainly applies to the case where a total of the first and second active material particles is 90 mass % or more of the positive electrode active material.

The first active material is a lithium-manganese composite oxide. Although the crystal structure of the lithium-manganese composite oxide is not particularly limited, the lithium-manganese composite oxide having a spinel-type crystal structure costs less, has a very stable supply of raw materials, and is safe due to moderate generation of heat at a time of thermal runaway in the battery. Other than a spinel type, a rock-salt-like layer type can be given for the kind of the crystal structure. The lithium-manganese composite oxide collectively refers to oxides which include lithium and manganese as metal elements, and may include a metal element $M^1$ other than lithium and manganese. However, note that the present invention mainly applies to the case where a molar ratio of manganese is larger than that of the metal element $M^1$.

The lithium-manganese composite oxide is represented by, for example, $LiMn_2O_4$ but is not limited thereto, and may be represented by, for example, the general formula: $LiMn_{2-x}M^1_xO_4$. Here, element $M^1$ is preferably at least one selected from the group consisting of Al, Co, Ni, Mg, Fe, and B. In that case, it is preferable that $0 \leq x \leq 0.6$ is satisfied, and further preferable that $0.005 \leq x \leq 0.6$ is satisfied.

The second active material is a lithium-nickel composite oxide. The crystal structure of the lithium-nickel composite oxide is not particularly limited, but a lithium-nickel composite oxide having a rock-salt-like-layer-type structure has excellent thermal stability. The lithium-nickel composite oxide collectively refers to oxides which include lithium and nickel as metal elements, and may include a metal element $M^2$ other than lithium and nickel. However, note that the present invention mainly applies to the case where a molar ratio of nickel is larger than that of $M^2$.

The lithium-nickel composite oxide is represented by, for example, $LiNiO_2$ but is not limited thereto, and may be represented by, for example, the general formula: $LiNi_{1-y}M^2_yO_2$. Here, element $M^2$ is preferably at least one selected from the group consisting of Co, Al, Mn, W, Ti, Nb, Ba, and B. In that case, it is preferable that $0 \leq y < 0.5$ is satisfied, and further preferable that $0.01 \leq y < 0.4$ is satisfied.

Elution of manganese from the first active material is accelerated, presumably due to the presence of hydrogen ions in the non-aqueous electrolyte. On the other hand, the second active material is known to cause an exchange reaction between hydrogen ions in the non-aqueous electrolyte and lithium ions. Therefore, by arranging the second active material such that it surrounds the first active material, hydrogen ion concentration in the non-aqueous electrolyte in the vicinity of the first active material can be reduced; and elution of manganese from the first active material can be suppressed. Thus, charge-discharge characteristics of the battery can be improved significantly.

A proportion of the first active material particles included in the positive electrode active material is 51 vol % to 90 vol %. That is, the positive electrode active material is mainly composed of the first active material which has high thermal stability. By increasing the proportion of the first active material included in the positive electrode active material, reliability of the battery at high temperatures improves. Moreover, due to a proportion of the second active material (lithium-nickel composite oxide) being 10 vol % or more, elution of manganese from the lithium-manganese composite oxide can be suppressed, and a battery with excellent charge-discharge cycle characteristics can be obtained. According to simulation results, for the second active material to come in contact with the first active material, at least about 6.8 vol % of the second active material is necessary. Considering the extent to which the first and second active material particles are dispersed when they are mixed, the proportion of the second active material particles included in the positive electrode active material is preferably 10 vol % or more, and further preferably 10 to 40 vol %.

A volume-based particle size distribution of the first active material particles (hereafter, also referred to as first particle size distribution) has at least two peaks. There may be three or more peaks, but here, attention will be on two peaks, one referred to as a first peak on a larger particle side, and the other referred to as a second peak on a smaller particle side. However, note that a first particle size $D_1$ corresponding to the first peak on the larger particle side is 2.5 to 5.0 times larger than a particle size $D_2$ corresponding to the second peak on the smaller particle side ($2.5 \leq D_1/D_2 \leq 5.0$). The condition of this relationship, when satisfied, interacts with other conditions required of the positive electrode active material, thereby enabling improvement in a packing ability of the positive electrode active material, and suppression of the breaking of the particles. For example, presumably, by the smaller particles being embedded in spaces between the larger particles, the active material density in the positive electrode mixture layer can be increased with a smaller amount of pressure, compared to when only the larger particles are present. In terms of obtaining such work and effect more reliably, it is preferable that $2.5 \leq D_1/D_2 \leq 4.0$ is satisfied.

On the other hand, a particle size distribution of the second active material particles (hereafter, also referred to as second particle size distribution) has at least one peak. There may be two or more peaks. However, it is important that the second particle size distribution has a third peak corresponding to a third particle size $D_3$ which satisfies $D_1>D_3>D_2$. The condition of $D_1>D_3>D_2$, when satisfied, interacts with other conditions required of the positive electrode active material, thereby enabling improvement in the packing ability of the positive electrode active material, and suppression of the breaking of the particles; and also enabling increase in the effect of suppressing elution of manganese from the first active material. Moreover, the second active material particles having a volume smaller than the first active material particles, effectively fill the spaces between the large and small particles. Therefore, the packing ability of the first active material particles is not reduced. Still moreover, presumably, packing of the particles having the above particle size distributions secures contact between the first and second active material particles, and thus, the effect of suppressing elution of manganese increases.

Here, the proportion of the first active material particles included in the positive electrode active material, the particle size distribution of the first active material particles, and the particle size distribution of the second active material particles, can be obtained, for example, in the following manner.

First, the positive electrode is embedded in resin, followed by polishing to expose a vertical section of the positive electrode mixture layer, and further followed by taking an image of the vertical section with a scanning electron microscope (SEM). In this image, a vertical section of the positive electrode active material can be observed. By composition analysis, the positive electrode active material can be classified into a first active material and a second active material, and graphically represented in the form of a sectional illustration.

Next, by using the sectional illustration, an area S of the first active material particles and an area S of the second active material particles are each measured by image analysis. The area occupied by the first active material particles in a total area of the positive electrode active material, can be regarded as a volume occupied by the first active material particles in the positive electrode active material. As such, the proportion of the first active material particles included in the positive electrode active material can be obtained by image analysis of an image of a vertical section of the positive electrode mixture layer.

Here, it is supposed that a relational expression (1), as follows, is satisfied between each of the areas S and R representing particle size:

$$S=(R/2)^2 \times \pi \text{ (where } \pi \text{ represents the ratio of the circumference of a circle to its diameter)} \quad (1)$$

Supposing that the R satisfying the expression (1) represents particle sizes of the first and second active material particles, respectively, volume-based (area-based) particle size distributions of the first and second active material particles, respectively, are produced. If a total number (n) of the particles distributed is 80 or more in each of the particle size distributions, each of the distributions can be regarded as statistical data.

As described above, the first active material particles have the first peak on the larger particle side and the second peak on the smaller particle side. Therefore, by measuring the resolution of the first and second peaks in the particle size distribution of the first active material particles, the first active material particles can be classified into a first particle group and a second particle group, the former corresponding to the first peak and the latter corresponding to the second peak. The point where the waves separate, may be at a particle size that has the least frequency and is between the first and second peaks. At that time, a proportion of the first particle group included in the first active material particles is preferably 60 vol % to 80 vol %. Due to the proportion of the first particle group on the larger particle side being in the above range, packing abilities of the first and second particle groups in the first active material particles improve, and also, a packing ability of the second active material particles improves; and moreover, there is a greater effect in improving the probability of the first and second active materials being in close proximity to one another.

A volume of the first and second particle groups included in the first active material particles can be obtained as a total of a volume V of the first particle group and a volume V of the second particle group, the volumes V each obtained by an equation (2) as follows, when the R of the aforementioned expression (1) is used:

$$V=(4/3) \times (R/2)^3 \times \pi \text{ (where } \pi \text{ represents the ratio of the circumference of a circle to its diameter)} \quad (2)$$

The density of the positive electrode active material in the positive electrode mixture layer is preferably 3.3 g/cm$^3$ or less. Producing a positive electrode in which the density of the positive electrode active material is more than 3.3 g/cm$^3$, may cause application of too much pressure to the positive electrode mixture layer when rolled, and may cause reduction in the effect of suppressing elution of manganese from the second active material. In contrast, a positive electrode in which the density of the positive electrode active material is 3.3 g/cm$^3$ or less, can be produced without application of too much pressure to the positive electrode mixture layer. Thus, there is increase in the effect of suppressing the breaking of the active material particles. Moreover, in the positive electrode mixture layer, the first and second active material particles can sufficiently come in contact with and interact with one another. Thus, there is also increase in the effect of suppressing elution of manganese from the first active material particles. In terms of securing capacity characteristics, it is preferable that the density of the positive electrode active material in the positive electrode mixture layer is 2.5 g/cm$^3$ or more.

The density of the positive electrode active material in the positive electrode mixture layer may be less than 2.5 g/cm$^3$. In that case, the pressure used in pressing the positive electrode mixture layer during the production process of the electrode, may be small. Thus, it is unlikely that the first active material particles will break, and unlikely that battery characteristics will lower due to elution of manganese. Thus, the structure of the present invention has great technical significance in particular, when the density of the positive electrode active material is 2.5 g/cm$^3$ or more.

The particle sizes corresponding to the two peaks of the first active material particles are each preferably in the range of 8 to 40 μm, and preferably satisfies 8 μm≤$D_2$≤15 μm and 15 μm≤$D_1$≤40 μm. Due to the first particle size $D_1$ corresponding to the first peak being 40 μm or less, there is little to no surface roughening of the positive electrode mixture layer when the layer is pressed, and an electrode with a very smooth surface is obtained. Moreover, the second particle size $D_2$ being 8 μm or more enables suppression of increase in the surface area of the first active material particles, and enables increase in the effect of suppressing elution of manganese.

The third particle size $D_3$ corresponding to the third peak for the second active material particles is preferably in the range of 9 to 20 μm. Due to the third particle size $D_3$ being 9 μm or more, it becomes easier to obtain a positive electrode with excellent thermal stability. Moreover, due to the third particle size $D_3$ being 9 μm or more, frictional resistance between the particles can be reduced. Thus, even if a large amount of pressure is applied to the positive electrode mixture layer during pressing, the active material particles will not break easily. Moreover, due to the third particle size $D_3$ being 20 μm or less, it becomes easier for the second active material particles to fill the spaces between the first active material particles.

The positive electrode mixture layer can include a conductive agent and a binder as optional components, in addition to the positive electrode active material which is an indispensable component.

Examples of the conductive agent include: graphites such as natural graphite and artificial graphite; carbon blacks such as acetylene black, Ketjen black, channel black, furnace black, lamp black, and thermal black; conductive fibers such as carbon fibers and metal fibers; carbon fluoride powder; metal powders such as aluminum powder; conductive whiskers such as zinc oxide whiskers and potassium titanate whiskers; conductive metal oxides such as titanium oxide; and conductive organic materials such as phenylene derivatives. These conductive agents may be used singly or in a combination of two or more. An amount of the conductive agent added to the positive electrode mixture layer is preferably 0.2 to 30 mass % and further preferably 0.2 to 10 mass %.

Examples of the binder include polyvinylidene fluoride (PVDF), polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyether sulfone, polyhexafluoropropylene, styrene-butadiene rubber, and carboxymethyl cellulose. The binder may also be a copolymer comprising two or more materials selected from tetrafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. These binders may be used singly or in a combination of two or more. An amount of the binder added to the positive electrode mixture layer is preferably 0.2 to 4 mass %.

A negative electrode comprises, for example, a negative electrode current collector and a negative electrode active material layer attached thereto.

The negative electrode current collector is, for example, a conductive material in sheet form. Alternatively, a battery case may serve as both the case and the current collector. The negative electrode active material layer may be formed on one surface only, or both surfaces, of the current collector in sheet form. The material of the current collector in sheet form may be, for example, a metal foil of copper, stainless steel, nickel, titanium, or the like; a carbon material; or a conductive resin. Alternatively, a conductive material such as carbon, nickel, or titanium may be coated on a surface of a sheet material.

The negative electrode active material layer may be a mixture layer, or a deposited film, including a negative electrode active material. The negative electrode mixture layer includes the negative electrode active material capable of absorbing and releasing lithium ions, as an indispensable component; and can include a conductive agent and a binder as optional components.

The negative electrode active material is not particularly limited, and examples thereof include: carbon materials such as natural graphite, artificial graphite, expanded graphite, and amorphous carbon; an olivine-type lithium-containing transition metal oxide; a spinel-type lithium titanium oxide; silicon (Si); a silicon compound; a silicon alloy; tin (Sn); a tin compound; and an tin alloy. The silicon compound can be a silicon oxide such as $SiO_x$ (0.05<x<1.95); or an alloy, compound, or solid solution of a silicon simple substance or silicon oxide in which silicon atoms are partially replaced with at least one element selected from the group consisting of B, Mg, Ni, Ti, Mo, Co, Ca, Cr, Cu, Fe, Mn, Nb, Ta, V, W, Zn, C, N, and Sn. The tin alloy and tin compound may be $Ni_2Sn_4$, $Mg_2Sn$, $SnO_x$ (0<x<2), $SnO_2$, $SnSiO_3$, LiSnO or the like. In the case where the negative electrode active material has poor electron conductivity, a surface thereof may be modified with carbon nanofibers (CNFs). These negative electrode active materials may be used singly or in a combination of two or more.

For the binder to be included in the negative electrode mixture layer, for example, an arbitrary selection can be made from the materials given as examples for the binder for the positive electrode. Regarding the conductive agent to be included in the negative electrode mixture layer, examples thereof include: graphites such as natural graphite, artificial graphite, and expanded graphite; carbon blacks such as acetylene black, Ketjen black, channel black, furnace black, lamp black, and thermal black; conductive fibers such as carbon fibers and metal fibers; metal powders such as copper powder and nickel powder; and conductive organic materials such as polyphenylene derivatives.

The non-aqueous electrolyte layer can be a separator which includes a non-aqueous electrolyte, a polymer electrolyte layer in which the electrolyte is immobilized, or the like. The non-aqueous electrolyte can be a solution comprising a non-aqueous solvent and a solute such as a lithium salt dissolved therein. Alternatively, the non-aqueous electrolyte layer may be a solid electrolyte layer comprising an inorganic material such as a lithium nitride, a lithium halide, a lithium oxoacid salt, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, or a phosphorous sulfide compound.

The separator can be a non-woven fabric or microporous film comprising polyethylene, polypropylene, polyamide (e.g., aramid), amide-imide, polyphenylene sulfide, polyimide, or the like. The separator may have therein, or on a surface thereof, a heat resistant filler comprising alumina, magnesia, silica, titania, or the like. In addition to the separator, a heat resistant layer comprising a heat resistant filler and a binder may be disposed on a surface of the positive or negative electrode.

Examples of the solute for the non-aqueous electrolyte include $LiPF_6$, $LiBF_4$, $LiClO_4$, $LiAlCl_4$, $LiSbF_6$, LiSCN, $LiCF_3SO_3$, $LiN(CF_3CO_2)$, $LiN(CF_3SO_2)_2$, $LiAsF_6$, and $LiB_{10}Cl_{10}$. These may be used singly or in a combination of two or more.

Examples of the non-aqueous solvent for the non-aqueous electrolyte include: ethylene carbonate (EC); propylene carbonate; butylene carbonate; vinylene carbonate; dimethyl carbonate (DMC); diethyl carbonate; ethyl methyl carbonate (EMC); dipropyl carbonate; methyl formate; methyl acetate; methyl propionate; ethyl propionate; dimethoxymethane; γ-butyrolactone; γ-valerolactone; 1,2-diethoxyethane; 1,2-dimethoxyethane; ethoxymethoxyethane; trimethoxymethane; tetrahydrofuran; tetrahydrofuran derivatives such as 2-methyltetrahydrofuran; dimethylsulfoxide; dioxolan derivatives such as 1,3-dioxolan and 4-methyl-1,3-dioxolan; formamide; acetamide; dimethyl formamide; acetonitrile; propionitrile; nitromethane; ethyl monoglyme; triester phosphate; acetic acid ester; propionic acid ester; sulfolane; 3-methylsulfolane; 1,3-dimethyl-2-imidazolidinone; 3-methyl-2-oxazolidinone; propylene carbonate derivatives; ethyl ether; diethyl ether; 1,3-propane sultone; anisole; and fluorobenzene. These may be used singly or in a combination of two or more.

The non-aqueous electrolyte may include an additive, examples thereof including vinylene carbonate, cyclohexyl benzene, biphenyl, diphenyl ether, vinylethylene carbonate, divinylethylene carbonate, phenylethylene carbonate, diallyl carbonate, fluoroethylene carbonate, catechol carbonate, vinyl acetate, ethylene sulfide, propane sultone, trifluoropropylene carbonate, dibenzofuran, 2,4-difluoroanisole, ortho-terphenyl, and meta-terphenyl.

If the solute is mixed with a polymeric material such as polyethylene oxide, polypropylene oxide, polyphosphazene, polyaziridine, polyethylene sulfide, polyvinyl alcohol, polyvinylidene fluoride, or polyhexafluoropropylene, a solid polymer electrolyte can be obtained. If the above polymeric material, the solute, and the non-aqueous solvent are mixed together, a gel polymer electrolyte can be obtained.

Next, with reference to drawings, a description will be given of a non-aqueous electrolyte secondary battery according to an embodiment of the present invention. However, note that the following embodiment does not limit the present invention, and can be altered and modified as appropriate within the scope of achieving the effects of the present invention.

Figure 1:
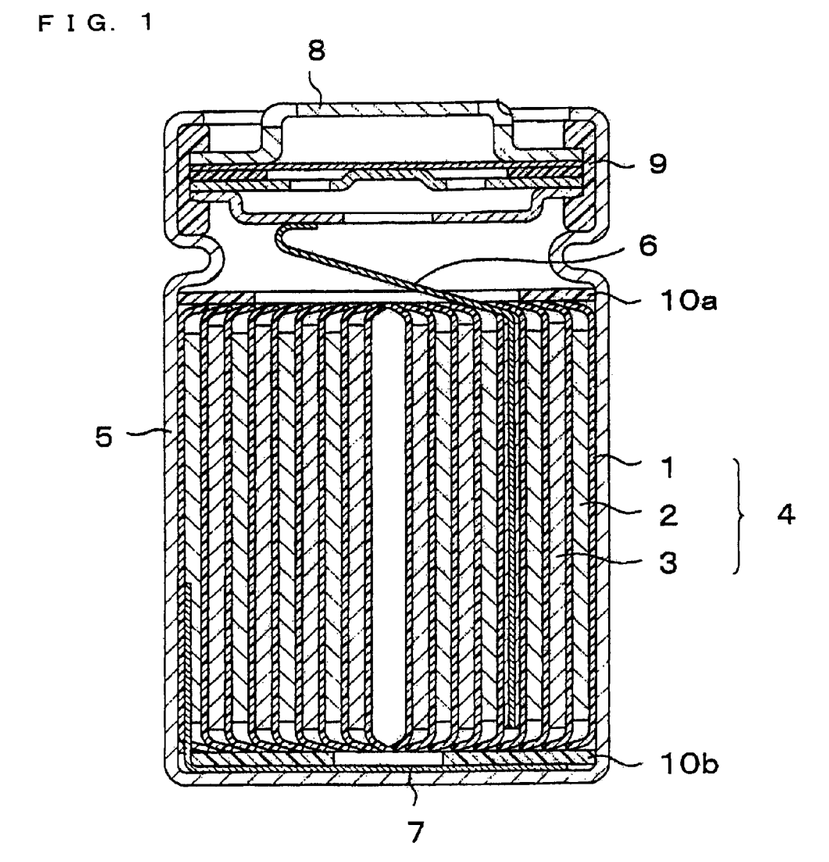
FIG. 1 A vertical sectional view of a non-aqueous electrolyte secondary battery according to an embodiment of the present invention FIG. 2 A scanning electron microscope (SEM) image of a vertical section of a positive electrode in Battery A1 according to an Example of the present invention FIG. 3 An SEM image of a vertical section of a positive electrode in Battery B2 according to a Comparative Example for the present invention FIG. 4 A sectional illustration of the positive electrode in Battery A1

FIG. 1 is a vertical sectional view of a cylindrical non-aqueous electrolyte secondary battery. Here, a positive electrode 2 and a negative electrode 3 are spirally wound, with a separator (non-aqueous electrolyte layer) 1 including a non-aqueous electrolyte interposed therebetween, thereby to produce an electrode assembly 4. The electrode assembly 4 is contained, together with the non-aqueous electrolyte (not illustrated), in a battery case 5. Each of the positive electrode 2 and the negative electrode 3 comprise: a current collector; and a mixture layer including an active material, formed on a surface of the current collector. The opening of the battery case 5 is sealed with a sealing plate 8, with a gasket 9 disposed in between. A positive lead 6 attached to the positive electrode 2, is connected to the sealing plate 8 which also serves as a positive terminal. A negative lead 7 attached to the negative electrode 3, is connected to the bottom of the battery case 5 which also serves as a negative terminal.

The non-aqueous electrolyte secondary battery of the present invention is not limited to the structure illustrated in FIG. 1, and can also be applied to, for example, a prismatic lithium secondary battery; and moreover, there is no particular limitation to the materials used for the components of the lithium secondary battery. For example, the electrode assembly 4 may be a kind in which the positive electrode 2 and the negative electrode 3 are stacked alternately on one another, with the separator 1 between the positive and negative electrodes. Alternatively, the electrode assembly 4 may be configured such that the positive lead 6 is connected to the battery case (e.g., Al can). Further alternatively, the electrode assembly 4 may be configured such that the battery case is not connected to the positive or negative electrode (i.e., configured such that insulation is maintained between the battery case and the positive or negative terminal).

EXAMPLES

Example 1

(1) Production of Positive Electrode Plate $Li_2CO_3$ and an electrolytic manganese dioxide were mixed, followed by baking at 780° C. in an oxygen atmosphere, thereby to obtain a spinel-type lithium-manganese composite oxide (first active material) having a particle size of 3 to 50 μm. This was classified by using an elbow-type classifier (Elbow-Jet Air Classifier available from Matsubo Corporation), thereby to obtain a first particle group and a second particle group, the former having a volume-based particle size distribution with a peak at 32 μm, and the latter having a volume-based particle size distribution with a peak at 9.5 μm. Next, the first particle group with the peak positioned at 32 μm and the second particle group with the peak positioned at 9.5 μm were mixed at a mass ratio of 6:4, thereby to obtain first active material particles. Measurements for the particle size distributions were performed by using MT3000 available from Microtrac, Inc. The first active material had a true density of 4.25 g/cm³.

Lithium hydroxide, nickel nitrate, cobalt nitrate, and aluminum nitrate were mixed, followed by baking at 800° C. in an oxygen atmosphere, thereby to obtain a lithium-nickel composite oxide ($LiNi_{0.8}Co_{0.15}Al_{0.05}O_2$ (second active material)) having a particle size of 5 to 50 μm. This was classified, thereby to obtain a particle group (second active material particles) of $LiNi_{0.8}Co_{0.15}Al_{0.05}O_2$ having a volume-based particle size distribution with a peak at 12 µm. The second active material had a true density of 4.75 g/cm³.

Next, the first and second active material particles were mixed, thereby to obtain a positive electrode active material in which a proportion of the former was 80 vol % and a proportion of the latter was 20 vol %. Specifically, 0.78 kg of the first active material particles, 0.22 kg of the second active material particles, 0.50 kg of an N-methyl-2-pyrrolidone (NMP) solution containing polyvinylidene fluoride (PVDF) (#1320 available from Kureha Co., Ltd., concentration of solid content: 12 wt %), 30 g of acetylene black, and a proper amount of NMP were put in a double arm kneader and stirred at 30° C. for 30 minutes, thereby to obtain a positive electrode mixture paste.

Next, the positive electrode mixture paste obtained was applied to both surfaces of a 20 µm-thick aluminum foil serving as a current collector, followed by drying at 120° C. for 15 minutes. Then, the stack of the current collector and the positive electrode mixture layers was pressed with a roll press, and adjusted to have a total thickness of 120 µm. At that time, the rollers of the roll press, provided as a pair, each had a diameter of 40 cm; and the linear pressure indicating the pressure during pressing was 10,000 N/cm. As a result, the density of the positive electrode active material in the positive electrode mixture layer became 3.22 g/cm³.

The positive electrode obtained was cut into 600 mm in length and 59 mm in width. Moreover, a positive lead was attached to a part of the positive electrode. The processes of preparing the positive electrode mixture paste, applying the paste to the current collector, and forming the positive electrode, were each performed in an environment where the dew point was maintainable at −30° C. or lower.

(2) Production of Negative Electrode

Three kg of artificial graphite, 200 g of an aqueous dispersion of modified styrene-butadiene rubber (BM-400B available from Zeon Corporation, solid content: 40 wt %), 50 g of carboxymethyl cellulose, and a proper amount of water were put into a double arm kneader and stirred, thereby to prepare a negative electrode mixture paste.

Next, the negative electrode mixture paste obtained was applied to both surfaces of a 12 µm-thick copper foil serving as a current collector, followed by drying at 120° C. The resultant was then rolled with a roll press, such that a total thickness of the current collector and the negative electrode mixture layers, i.e., the thickness of the negative electrode, became 150 µm.

The negative electrode obtained was cut into 700 mm in length and 60 mm in width. Moreover, a negative lead was attached to a part of the negative electrode.

(3) Preparation of Non-Aqueous Electrolyte

LiPF$_6$ was dissolved at a concentration of 1.2 mol/L in a mixed solvent of ethylene carbonate, ethyl methyl carbonate, and dimethyl carbonate mixed at a volume ratio of 2:3:5. Then, vinylene carbonate (VC) was dissolved at a concentration of 4 wt % in the resultant, thereby to prepare a non-aqueous electrolyte.

(4) Production of Cylindrical Battery

A wound-type electrode assembly was inserted into a case, the electrode assembly comprising: the positive electrode provided with the positive lead, obtained in (1) above; the negative electrode provided with the negative lead, obtained in (2) above; and a separator being a composite film (Product No. 2320 available from Celgard LLC, thickness: 20 µm) made of polyethylene and polypropylene. Thereafter, the non-aqueous electrolyte obtained in (3) above was injected into the case, and the opening of the case was sealed, thereby to produce a cylindrical non-aqueous electrolyte secondary battery 65 mm in height and 18 mm in diameter, as illustrated in FIG. 1. The design capacity was 2,000 mAh. This battery was referred to as Battery A1.

(5) Image Analysis of Vertical Section of Positive Electrode

The positive electrode used in Battery A1 was embedded in resin, followed by polishing, thereby to expose a vertical section of the positive electrode mixture layer. Then, the exposed section was observed with an SEM. An image of this section is shown in FIG. 2.

Figure 2:
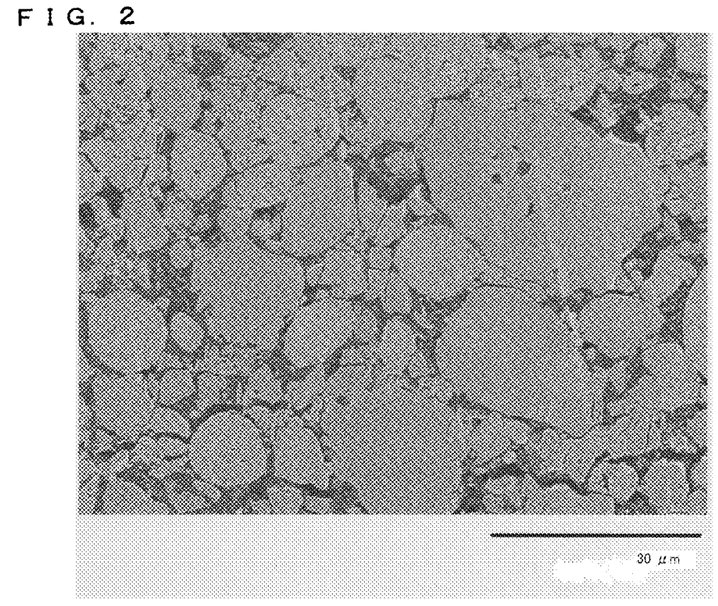

In FIG. 2, the first active material, i.e., the spinel-type lithium-manganese composite oxide, and the second active material, i.e., the lithium-nickel composite oxide, were identified by composition analysis, thereby to create an illustration of the vertical section of the positive electrode mixture layer in Battery A1. This illustration is shown in FIG. 4.

Figure 4:
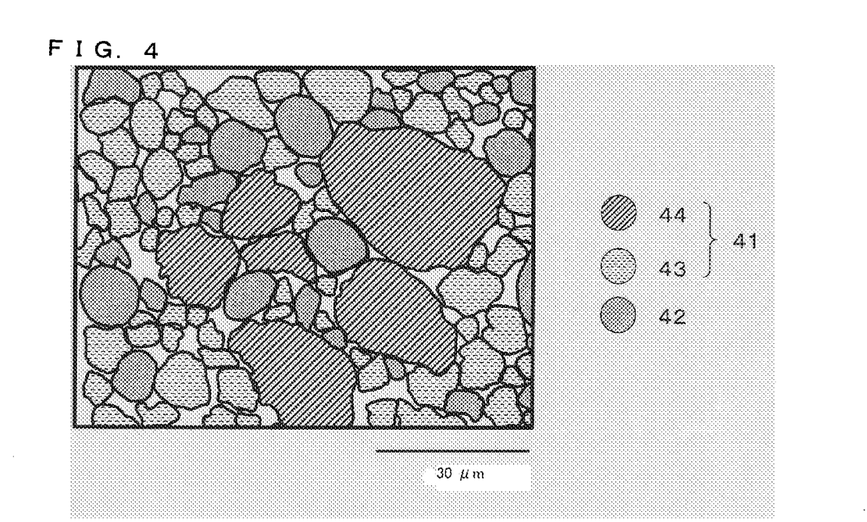
Figure 6:
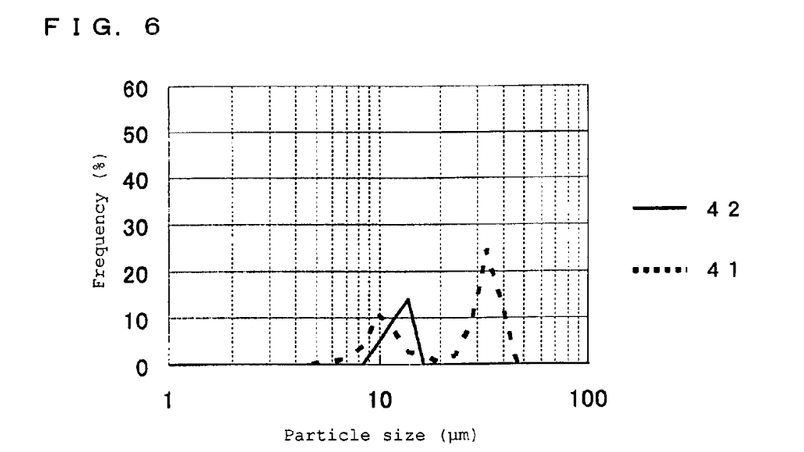
FIG. 6 A graph showing particle size distributions of a positive electrode active material in Battery A1

By using FIG. 4, an area S occupied by the first active material particles 41 and an area S occupied by the second active material particles 42 were measured. Then, on the supposition that the R satisfying the aforementioned expression (1) represented particle size, volume-based particle size distributions were produced for the first and second active material particles 41 and 42, respectively. FIG. 6 shows the volume-based particle size distributions that were obtained.

From FIG. 6 which shows the analysis results for the vertical surface of the positive electrode mixture layer in Battery A1, it can be understood that even after the layer was pressed with a roll press, the particle size distribution of the first active material particles 41 had a first peak and a second peak, the former being on a larger particle side and the latter being on a smaller particle side. A first particle size $D_1$ corresponding to the first peak (i.e., corresponding to a first particle group 44) was 32 µm, and a second particle size $D_2$ corresponding to the second peak (i.e., corresponding to a second particle group 43) was 9.9 µm.

The particle size distribution of the second active material particles 42 had one peak (third peak), and a third particle size $D_3$ corresponding to the third peak was 11.8 µm. That is, a relationship of $D_1>D_3>D_2$ was established.

A proportion of the second active material particles 42 included in the positive electrode active material was 24 vol % (i.e., a proportion of the first active material particles 41 was 76 vol %). A proportion of the first particle group 44 included in the first active material particles 41, when obtained by using the aforementioned formula (2), was 60.3 vol %.

As above, even after the positive electrode mixture layer was pressed, the particle size distributions, peak positions, and mix proportions of the first and second active material particles used were mostly reproduced. The number of test samples (number of analyzed particles) at that time was 108.

Example 2

A spinel-type lithium-manganese composite oxide (first active material) obtained in the same manner as Example 1 was classified, thereby to obtain a first particle group and a second particle group, the former having a particle size distribution with a peak at 20 µm and the latter having a particle size distribution with a peak at 8 µm. Next, the first particle group and the second particle group were mixed at a mass ratio of 6:4 (20 µm:8 µm), thereby to obtain first active material particles. On the other hand, a lithium-nickel composite oxide (second active material) obtained in the same manner as Example 1 was classified, thereby to obtain second active material particles having a particle size distribution with a peak at 9 µm. Except for the above, a cylindrical non-aqueous electrolyte secondary battery was produced in the same manner as Example 1, and was referred to as Battery A2.

Example 3

First active material particles and second active material particles obtained in the same manner as Example 1 were mixed, such that a proportion of the first active material particles was 90 vol %. Except for the above, a cylindrical non-aqueous electrolyte secondary battery was produced in the same manner as Example 1, and was referred to as Battery A3.

Comparative Example 1

First active material particles and second active material particles obtained in the same manner as Example 1 were mixed, such that a proportion of the first active material particles was 95 vol %. Except for the above, a cylindrical non-aqueous electrolyte secondary battery was produced in the same manner as Example 1, and was referred to as Battery B1.

Example 4

First active material particles and second active material particles obtained in the same manner as Example 1 were mixed, such that a proportion of the first active material particles was 51 vol %. Except for the above, a cylindrical non-aqueous electrolyte secondary battery was produced in the same manner as Example 1, and was referred to as Battery A4.

Comparative Example 2

A spinel-type lithium-manganese composite oxide (first active material) obtained in the same manner as Example 1 was classified, thereby to obtain first active material particles having a particle size distribution with only one peak at 21 μm. Except for using the first active material particles obtained as above, a cylindrical non-aqueous electrolyte secondary battery was produced in the same manner as Example 1, and was referred to as Battery B2.

The positive electrode used in Battery B2 was embedded in resin, followed by polishing, thereby to expose a vertical section of the positive electrode mixture layer. Then, the exposed section was observed with an SEM. An image of this section is shown in FIG. 3.

Figure 3:
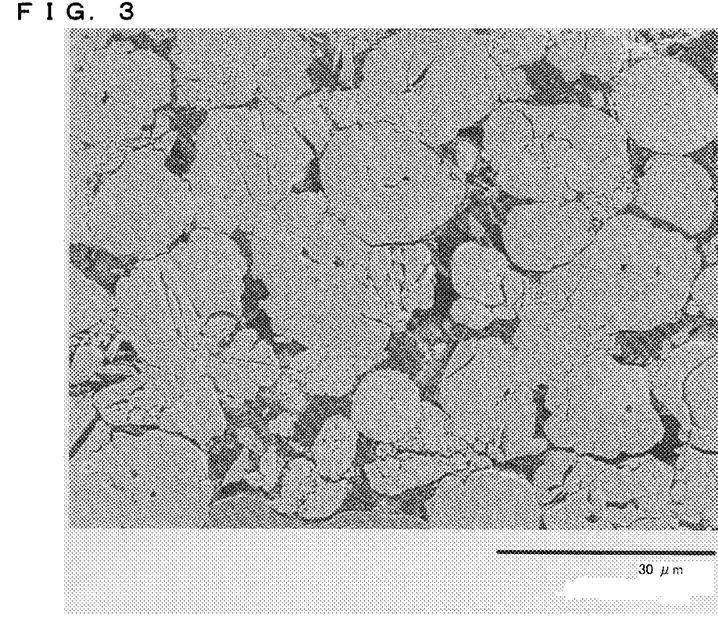

In FIG. 3, the first active material, i.e., the spinel-type lithium-manganese composite oxide, and the second active material, i.e., the lithium-nickel composite oxide, were identified by composition analysis, thereby to create an illustration of the vertical section of the positive electrode mixture layer in Battery B2. This illustration is shown in FIG. 5.

Figure 5:
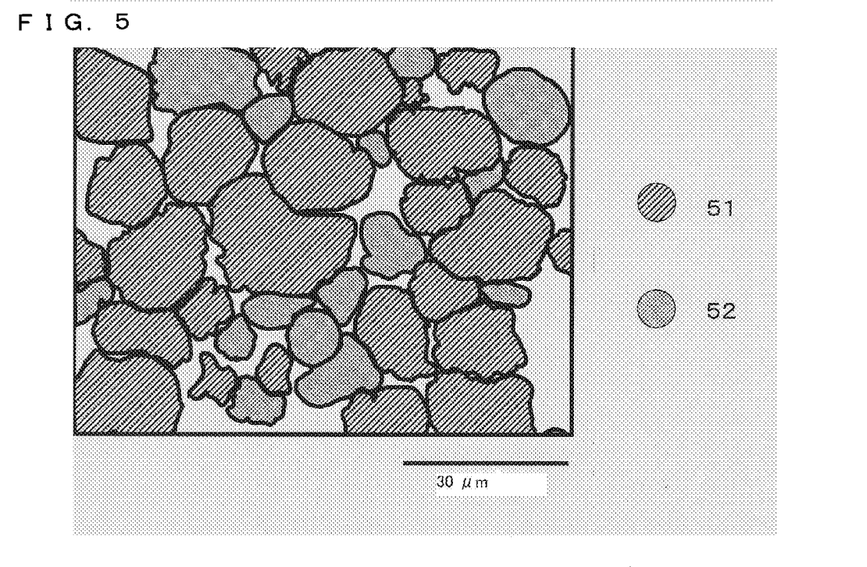
FIG. 5 A sectional illustration of the positive electrode in Battery B2
Figure 7:
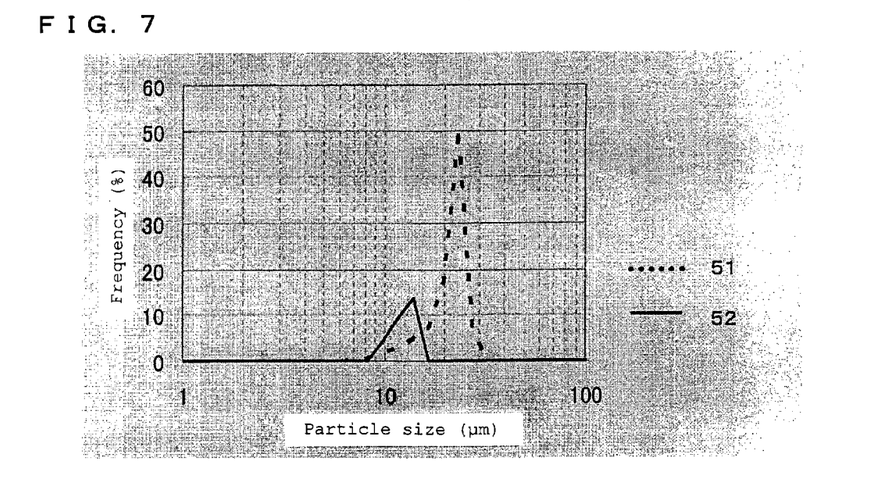
FIG. 7 A graph showing particle size distributions of a positive electrode active material in Battery B2

By using FIG. 5, an area S occupied by the first active material particles 51 and an area S occupied by the second active material particles 52 were measured. Then, on the supposition that the R satisfying the aforementioned expression (1) represented particle length in the longitudinal direction, volume-based particle size distributions were produced for the first and second active material particles 51 and 52, respectively. FIG. 7 shows the particle size distributions that were obtained.

From FIG. 7 which shows the analysis results for the vertical surface of the positive electrode mixture layer in Battery B2, it is evident that the particle size distribution of the first active material particles 51 had only one peak even after the layer was pressed with a roll press, and that a particle size corresponding to the peak was 20.9 μm.

The particle size distribution of the second active material particles 52 also had only one peak, and a particle size corresponding to the peak was 12.3 μm.

A proportion of the second active material particles 52 included in the positive electrode active material was 22 vol %, as a result of calculating the areas of the particles on the vertical surface (i.e., a proportion of the first active material particles 51 was 78 vol %).

As above, even after the positive electrode mixture layer was pressed, the particle size distributions, peak positions, and mix proportions of the first and second active material particles used were mostly reproduced. The number of test samples at that time was 116.

Comparative Example 3

A spinel-type lithium-manganese composite oxide (first active material) obtained in the same manner as Example 1 was classified, thereby to obtain first active material particles having a particle size distribution with only one peak at 9.5 μm. Except for using the first active material particles obtained as above, a cylindrical non-aqueous electrolyte secondary battery was produced in the same manner as Example 1, and was referred to as Battery B3.

Comparative Example 4

A spinel-type lithium-manganese composite oxide (first active material) obtained in the same manner as Example 1 was classified, thereby to obtain a first particle group and a second particle group, the former having a particle size distribution with a peak at 12 μm and the latter having a particle size distribution with a peak at 5 μm. Next, the first particle group and the second particle group were mixed at a mass ratio of 6:4 (12 μm:5 μm), thereby to obtain first active material particles. Except for the above, a cylindrical non-aqueous electrolyte secondary battery was produced in the same manner as Example 1, and was referred to as Battery B4.

Comparative Example 5

A spinel-type lithium-manganese composite oxide (first active material) obtained in the same manner as Example 1 was classified, thereby to obtain a first particle group and a second particle group, the former having a particle size distribution with a peak at 30 μm and the latter having a particle size distribution with a peak at 12 μm. Next, the first particle group and the second particle group were mixed at a mass ratio of 6:4 (30 μm:12 μm), thereby to obtain first active material particles. Except for the above, a cylindrical non-aqueous electrolyte secondary battery was produced in the same manner as Example 1, and was referred to as Battery B5.

Comparative Example 6

A spinel-type lithium-manganese composite oxide (first active material) obtained in the same manner as Example 1 was classified, thereby to obtain a first particle group and a second particle group, the former having a particle size distribution with a peak at 15 μm and the latter having a particle size distribution with a peak at 9.5 μm. Next, the first particle group and the second particle group were mixed at a mass ratio of 6:4 (15 μm:9.5 μm), thereby to obtain first active material particles. Except for the above, a cylindrical non-aqueous electrolyte secondary battery was produced in the same manner as Example 1, and was referred to as Battery B6.

Comparative Example 7

A spinel-type lithium-manganese composite oxide (first active material) obtained in the same manner as Example 1 was classified, thereby to obtain a first particle group and a second particle group, the former having a particle size distribution with a peak at 20 μm and the latter having a particle size distribution with a peak at 9.5 μm. Next, the first particle group and the second particle group were mixed at a mass ratio of 6:4 (20 μm:9.5 μm), thereby to obtain first active material particles. Except for the above, a cylindrical non-aqueous electrolyte secondary battery was produced in the same manner as Example 1, and was referred to as Battery B7.

Example 5

A spinel-type lithium-manganese composite oxide (first active material) obtained in the same manner as Example 1 was classified, thereby to obtain a first particle group and a second particle group, the former having a particle size distribution with a peak at 40 μm and the latter having a particle size distribution with a peak at 8 μm. Next, the first particle group and the second particle group were mixed at a mass ratio of 6:4 (40 μm:8 μm), thereby to obtain first active material particles. Except for the above, a cylindrical non-aqueous electrolyte secondary battery was produced in the same manner as Example 1, and was referred to as Battery A5.

Comparative Example 8

A spinel-type lithium-manganese composite oxide (first active material) obtained in the same manner as Example 1 was classified, thereby to obtain a first particle group and a second particle group, the former having a particle size distribution with a peak at 50 μm and the latter having a particle size distribution with a peak at 6 μm. Next, the first particle group and the second particle group were mixed at a mass ratio of 6:4 (50 μm:6 μm), thereby to obtain first active material particles. Except for the above, a cylindrical non-aqueous electrolyte secondary battery was produced in the same manner as Example 1, and was referred to as Battery B8.

Comparative Example 9

A spinel-type lithium-manganese composite oxide (first active material) obtained in the same manner as Example 1 was classified, thereby to obtain a first particle group and a second particle group, the former having a particle size distribution with a peak at 40 μm and the latter having a particle size distribution with a peak at 6 μm. Next, the first particle group and the second particle group were mixed at a mass ratio of 6:4 (40 μm:6 μm), thereby to obtain first active material particles. Except for the above, a cylindrical non-aqueous electrolyte secondary battery was produced in the same manner as Example 1, and was referred to as Battery B9.

Example 6

A spinel-type lithium-manganese composite oxide (first active material) obtained in the same manner as Example 1 was classified, thereby to obtain a first particle group and a second particle group, the former having a particle size distribution with a peak at 30 μm and the latter having a particle size distribution with a peak at 9.5 μm. Next, the first particle group and the second particle group were mixed at a mass ratio of 4:1 (30 μm:9.5 μm), thereby to obtain first active material particles. Except for the above, a cylindrical non-aqueous electrolyte secondary battery was produced in the same manner as Example 1, and was referred to as Battery A6.

Example 7

Except for mixing the first particle group and the second particle group at a mass ratio of 5:5 (30 μm:9.5 μm) to obtain first active material particles, a cylindrical non-aqueous electrolyte secondary battery was produced in the same manner as Example 6, and was referred to as Battery A7.

Example 8

Except for mixing the first particle group and the second particle group at a mass ratio of 4:6 (30 μm:9.5 μm) to obtain first active material particles, a cylindrical non-aqueous electrolyte secondary battery was produced in the same manner as Example 6, and was referred to as Battery A8.

Example 9

Except for mixing the first particle group and the second particle group at a mass ratio of 9:1 (30 μm:9.5 μm) to obtain first active material particles, a cylindrical non-aqueous electrolyte secondary battery was produced in the same manner as Example 6, and was referred to as Battery A9.

Example 10

In roll pressing, the positive electrode mixture layer was pressed between the rollers with the gap therebetween narrowed such that the density of the positive electrode active material in the layer became 3.3 g/cm$^3$. Except for the above, a cylindrical non-aqueous electrolyte secondary battery was produced in the same manner as Example 1, and was referred to as Battery A10.

Example 11

In roll pressing, the positive electrode mixture layer was pressed between the rollers with the gap therebetween narrowed such that the density of the positive electrode active material in the layer became 3.3 g/cm$^3$. Except for the above, a cylindrical non-aqueous electrolyte secondary battery was produced in the same manner as Example 2, and was referred to as Battery A11.

Example 12

In roll pressing, the positive electrode mixture layer was pressed between the rollers with the gap therebetween narrowed such that the density of the positive electrode active material in the layer became 3.35 g/cm$^3$. Except for the above, a cylindrical non-aqueous electrolyte secondary battery was produced in the same manner as Example 1, and was referred to as Battery A12.

Example 13

In roll pressing, the positive electrode mixture layer was pressed between the rollers with the gap therebetween narrowed such that the density of the positive electrode active material in the layer became 3.35 g/cm$^3$. Except for the above, a cylindrical non-aqueous electrolyte secondary battery was produced in the same manner as Example 2, and was referred to as Battery A13.

Example 14

In baking to obtain a spinel-type lithium-manganese composite oxide, Al(NO$_3$)$_3$ was added to the raw materials; and Al was dissolved in the resultant, at a molar ratio of 6% relative to Mn, thereby to obtain LiMn$_{1.88}$Al$_{0.12}$O$_4$ (first active material). This was classified by using the aforementioned elbow-type classifier, thereby to obtain a first particle group and a second particle group, the former having a volume-based particle size distribution with a peak at 30 μm and the latter having a volume-based particle size distribution with a peak at 9.5 μm. Next, the first particle group and the second particle group were mixed at a mass ratio of 6:4, thereby to obtain first active material particles. Except for the above, a cylindrical non-aqueous electrolyte secondary battery was produced in the same manner as Example 1, and was referred to as Battery A14.

Comparative Example 10

Except for obtaining first active material particles in the same manner as Example 14 and mixing them with the second active material particles such that a proportion of the first active material particles became 95 vol %, a cylindrical non-aqueous electrolyte secondary battery was produced in the same manner as Example 1, and was referred to as Battery B10.

Comparative Example 11

A spinel-type lithium-manganese composite oxide (first active material) obtained in the same manner as Example 14 was classified, thereby to obtain first active material particles having a particle size distribution with only one peak at 21 μm. Except for using the first active material particles obtained as above, a cylindrical non-aqueous electrolyte secondary battery was produced in the same manner as Example 1, and was referred to as Battery B11.

Example 15

In baking to obtain a spinel-type lithium-manganese composite oxide, Mg(NO$_3$)$_2$ was added to the raw materials; and Mg was dissolved in the resultant, at a molar ratio of 3% relative to Mn, thereby to obtain LiMn$_{1.94}$Mg$_{0.06}$O$_4$ (first active material). This was classified by using the aforementioned elbow-type classifier, thereby to obtain a first particle group and a second particle group, the former having a volume-based particle size distribution with a peak at 30 μm and the latter having a volume-based particle size distribution with a peak at 9.5 μm. Next, the first particle group and the second particle group were mixed at a mass ratio of 6:4, thereby to obtain first active material particles. Except for the above, a cylindrical non-aqueous electrolyte secondary battery was produced in the same manner as Example 1, and was referred to as Battery A15.

Comparative Example 12

Except for obtaining first active material particles in the same manner as Example 15 and mixing them with the second active material particles such that a proportion of the first active material particles became 95 vol %, a cylindrical non-aqueous electrolyte secondary battery was produced in the same manner as Example 1, and was referred to as Battery B12.

Comparative Example 13

A spinel-type lithium-manganese composite oxide (first active material) obtained in the same manner as Example 15 was classified, thereby to obtain first active material particles having a particle size distribution with only one peak at 21 μm. Except for using the first active material particles obtained as above, a cylindrical non-aqueous electrolyte secondary battery was produced in the same manner as Example 1, and was referred to as Battery B13.

Example 16

An aqueous solution of metaboric acid (HBO$_2$) was added to a spinel-type lithium-manganese composite oxide obtained in the same manner as Example 1, and the resultant was baked again at 780° C., thereby to obtain a spinel-type lithium-manganese composite oxide (first active material particles) having a surface modified with a boron compound. A molar ratio of boron relative to Mn was 0.1%. The composite oxide obtained was classified by using the aforementioned elbow-type classifier, thereby to obtain a first particle group and a second particle group, the former having a volume-based particle size distribution with a peak at 30 μm and the latter having a volume-based particle size distribution with a peak at 9.5 μm. Next, the first particle group and the second particle group were mixed at a mass ratio of 6:4, thereby to obtain first active material particles. Except for the above, a cylindrical non-aqueous electrolyte secondary battery was produced in the same manner as Example 1, and was referred to as Battery A16.

In the same manner as Example 1, image analysis was performed by using an image of a vertical section of the positive electrode mixture layer in each of Examples 2 to 16 and Comparative Examples 1 to 13. Table 1 shows the particle size distributions, peak positions ($D_1$, $D_2$, and $D_3$), and mix proportions that were obtained for the Examples and Comparative Examples.

EVALUATION

Each of the batteries was charged and discharged repeatedly in an ambient temperature of 45° C., under the following conditions.

Charging was performed at a constant voltage of 4.2 V, with a maximum current of 1.4 A. Requirement for charge termination (end-of-charge current) was 0.05 A. Thereafter, discharging was performed at a constant current of 2 A, and requirement for discharge termination (end-of-discharge voltage) was 3 V. Rest time between charging and discharging was 30 minutes.

The above charge-discharge cycle, regarded as 1 cycle, was repeated 500 times. Thereafter, the percentage of a discharge capacity after the 500$^{th}$ cycle relative to a discharge capacity after the 1$^{st}$ cycle was calculated, and was referred to as the capacity retention rate (%).

Table 1 below shows data and evaluation results for Batteries A1 to A16 and B1 to B13.

TABLE 1

| | Number Of Particles analyzed | Initial state First active material particles | | | Analysis result First active material particles | | | Initial state (First: Second) particle group (mass ratio) | Analysis result | |
|---|---|---|---|---|---|---|---|---|---|---|
| | | $D_1$ (μm) | $D_2$ (μm) | $D_1/D_2$ | $D_1$ (μm) | $D_2$ (μm) | $D_1/D_2$ | | First particle group Larger particles (volume ratio) | Second particle group Smaller particles (volume ratio) |
| Bat. A1 | 108 | 30 | 9.5 | 3.16 | 32 | 9.9 | 3.23 | 6:4 | 6.03 | 3.97 |
| Bat. A2 | 102 | 20 | 8 | 2.5 | 20.3 | 8.1 | 2.51 | 6:4 | 6 | 4 |
| Bat. A3 | 95 | 30 | 9.5 | 3.16 | 29 | 9.3 | 3.12 | 6:4 | 6.05 | 3.95 |
| Bat. B1 | 104 | 30 | 9.5 | 3.16 | 31 | 9.5 | 3.26 | 6:4 | 6.01 | 3.99 |
| Bat. A4 | 111 | 30 | 9.5 | 3.16 | 32 | 9.5 | 3.37 | 6:4 | 6 | 4 |
| Bat. B2 | 116 | 21 | — | — | 20.9 | — | — | — | — | — |
| Bat. B3 | 97 | — | 9.5 | — | — | 9.8 | — | — | — | — |
| Bat. B4 | 108 | 12 | 5 | 2.4 | 12 | 4.9 | 2.45 | 6:4 | 6.04 | 3.96 |
| Bat. B5 | 121 | 30 | 12 | 2.5 | 31.2 | 11.9 | 2.62 | 6:4 | 6 | 4 |
| Bat. B6 | 105 | 15 | 9.5 | 1.58 | 14.5 | 9.5 | 1.53 | 6:4 | 6 | 4 |
| Bat. B7 | 102 | 20 | 9.5 | 2.11 | 19.2 | 9.4 | 2.04 | 6:4 | 6.03 | 3.97 |
| Bat. A5 | 121 | 40 | 8 | 5 | 40 | 8 | 5 | 6:4 | 6 | 4 |
| Bat. B8 | 123 | 50 | 6 | 8.33 | 49.5 | 6.2 | 7.98 | 6:4 | 6.02 | 3.98 |
| Bat. B9 | 102 | 40 | 6 | 6.67 | 40 | 6.1 | 6.56 | 6:4 | 6 | 4 |
| Bat. A6 | 99 | 30 | 9.5 | 3.16 | 29 | 9.3 | 3.12 | 4:1 | 3.97 | 1.03 |
| Bat. A7 | 103 | 30 | 9.5 | 3.16 | 29 | 9.3 | 3.12 | 5:5 | 4.99 | 5.01 |
| Bat. A8 | 115 | 30 | 9.5 | 3.16 | 31 | 9.6 | 3.23 | 4:6 | 3.96 | 6.04 |
| Bat. A9 | 103 | 30 | 9.5 | 3.16 | 30.3 | 9.6 | 3.16 | 9:1 | 9.02 | 0.98 |
| Bat. A10 | 109 | 30 | 9.5 | 3.16 | 30.5 | 9.7 | 3.14 | 6:4 | 6.05 | 3.95 |
| Bat. A11 | 102 | 20 | 8 | 2.5 | 20 | 8 | 2.5 | 6:4 | 6.02 | 3.98 |
| Bat. A12 | 98 | 30 | 9.5 | 3.16 | 30.5 | 9.7 | 3.14 | 6:4 | 6.05 | 3.95 |
| Bat. A13 | 106 | 20 | 8 | 2.5 | 20 | 8 | 2.5 | 6:4 | 6 | 4 |
| Bat. A14 | 117 | 30 | 9.5 | 3.16 | 31 | 9.5 | 3.26 | 6:4 | 6.03 | 3.97 |
| Bat. B10 | 125 | 30 | 9.5 | 3.16 | 29.8 | 9.4 | 3.17 | 6:4 | 6.01 | 3.99 |
| Bat. B11 | 101 | 21 | — | — | 20.8 | — | — | — | — | — |
| Bat. A15 | 110 | 30 | 9.5 | 3.16 | 30.5 | 9.5 | 3.21 | 6:4 | 6.02 | 3.98 |
| Bat. B12 | 106 | 30 | 9.5 | 3.16 | 32 | 9.2 | 3.48 | 6:4 | 6.04 | 3.96 |
| Bat. B13 | 100 | 21 | — | — | 20.7 | — | — | — | — | — |
| Bat. A16 | 102 | 30 | 9.5 | 3.16 | 30.5 | 9.5 | 3.21 | 6:4 | 6.02 | 3.98 |

TABLE 1-continued

|  | Initial state Second active material particles $D_3$ (μm) | Analysis result (μm) | Initial state Proportion of first active material particles in positive electrode active material (vol %) | Analysis result (vol %) | Active material density (g/cm$^3$) | Capacity retention rate after 500 cycles (%) |
|---|---|---|---|---|---|---|
| Bat. A1 | 12 | 11.8 | 80 | 75 | 3.22 | 88 |
| Bat. A2 | 9 | 9.2 | 80 | 81 | 3.22 | 87 |
| Bat. A3 | 12 | 12.4 | 90 | 90 | 3.25 | 85 |
| Bat. B1 | 12 | 12 | 95 | 93 | 3.22 | 40 |
| Bat. A4 | 12 | 12 | 51 | 51 | 3.23 | 85 |
| Bat. B2 | 12 | 12.3 | 80 | 78 | 3.01 | 42 |
| Bat. B3 | 12 | 11.9 | 80 | 79 | 3 | 40 |
| Bat. B4 | 12 | 12.1 | 80 | 82 | 3.04 | 61 |
| Bat. B5 | 12 | 11.9 | 80 | 80 | 3.1 | 67 |
| Bat. B6 | 12 | 11.8 | 80 | 81 | 3.15 | 48 |
| Bat. B7 | 12 | 12 | 80 | 82 | 3.11 | 55 |
| Bat. A5 | 12 | 12.3 | 80 | 80 | 3.21 | 81 |
| Bat. B8 | 12 | 11.9 | 80 | 79 | 3.05 | 63 |
| Bat. B9 | 12 | 12.1 | 80 | 81 | 3.02 | 67 |
| Bat. A6 | 12 | 12.1 | 80 | 82 | 3.22 | 82 |
| Bat. A7 | 12 | 12.2 | 80 | 81 | 3.01 | 77 |
| Bat. A8 | 12 | 12.1 | 80 | 78 | 3.1 | 73 |
| Bat. A9 | 12 | 19.7 | 80 | 78 | 3.17 | 77 |
| Bat. A10 | 12 | 19.8 | 80 | 80 | 3.3 | 80 |
| Bat. A11 | 9 | 9.2 | 80 | 81 | 3.3 | 82 |
| Bat. A12 | 12 | 11.7 | 80 | 80 | 3.35 | 70 |
| Bat. A13 | 9 | 9.5 | 80 | 81 | 3.35 | 71 |
| Bat. A14 | 12 | 12.1 | 80 | 80 | 3.22 | 92 |
| Bat. B10 | 12 | 12.3 | 95 | 94 | 3.18 | 32 |
| Bat. B11 | 12 | 11.8 | 80 | 79 | 3.13 | 35 |
| Bat. A15 | 12 | 12.2 | 80 | 78 | 3.22 | 85 |
| Bat. B12 | 12 | 12.3 | 95 | 96 | 3.16 | 40 |
| Bat. B13 | 12 | 12 | 80 | 80 | 3.18 | 42 |
| Bat. A16 | 12 | 12.2 | 80 | 78 | 3.22 | 92 |

Regarding Batteries A1 to A16, particularly A1 to A11, the capacity retention rate after 500 cycles of the charge-discharge cycle was 80% or higher, and cycle characteristics were satisfactory, with no significant difference observed among the batteries. However, regarding Batteries B1 to B13, the capacity retention rate did not reach 70%, and cycle characteristics were less satisfactory compared to Batteries A1 to A16 of the Examples.

Regarding Batteries A1, A2, A3, A4, and A5, the particle size distribution of the spinel-type lithium-manganese composite oxide, i.e., the first active material, had the two peaks (first and second peaks). Moreover, the proportion of the first particle group of the larger particles was greater than the proportion of the second particle group of the smaller particles; and the third peak in the particle size distribution of the second active material particles, was present between the first and second peaks. Presumably due to the above, the spinel-type lithium-manganese composite oxide did not break to a great extent when the positive electrode was pressed with a roll press, and thus, satisfactory cycle characteristics were able to be maintained.

Regarding Battery B1, the proportion of the second active material particles included in the positive electrode active material was small, being 5 mass %. Therefore, presumably, the effect of suppressing elution of manganese from the first active material particles was small, due to insufficient contact between the first and second active material particles. Thus, presumably, cycle characteristics became reduced with the progression of the charge-discharge cycles, due to deposition of manganese on the negative electrode.

Regarding Batteries B2 to B9, A7 to A9, and B10 to B13, the density of the positive electrode active material in the positive electrode mixture layer did not reach 3.2 g/cm$^3$ when the positive electrode was pressed with a roll press, and the density of the positive electrode did not increase much. Particularly, regarding Batteries B2 and B3, the particle size distribution of the first active material particles had only one peak, and therefore, the packing ability of the positive electrode active material in the positive electrode mixture layer did not improve.

Regarding Battery B4, the first peak, i.e., the peak on the larger particle side, in the particle size distribution of the first active material particles, overlapped with the third peak in the particle size distribution of the second active material particles. Moreover, regarding Battery B5, the second peak, i.e., the peak on the smaller particle side, in the particle size distribution of the first active material particles, overlapped with the third peak in the particle size distribution of the second active material particles. Presumably due to the above, the packing ability of the positive electrode active material in the positive electrode mixture layer did not improve, and furthermore, contact between the first and second active material particles was not effective.

Regarding Batteries B6 and B7, the difference between the first particle size $D_1$ corresponding to the first peak for the first active material particles, and the second particle size $D_2$ corresponding to the second peak therefor, was too small. Regarding Batteries B8 and B9, the difference between the first particle size $D_1$ and the second particle size $D_2$ was too large. Presumably due to the above, in these batteries, the packing ability of the positive electrode active material in the positive electrode mixture layer did not improve.

Regarding Batteries A7 and A8, the proportion of the second particle group included in the first active material particles exceeded the proportion of the first particle group included therein, and therefore, the density of the positive electrode active material in the positive electrode mixture layer did not reach 3.05 g/cm$^3$. Moreover, from the fact that the capacity retention rate was 73 to 77% despite the cycle characteristics being comparatively satisfactory, presumably, there was some elution of manganese from the first active material particles.

Regarding Battery A9, the proportion of the first particle group included in the first active material particles was 90%. Therefore, the smaller particles necessary to fill in the spaces between the larger particles were somewhat lacking, and thus, the packing ability of the positive electrode active material in the positive electrode mixture layer did not improve. Moreover, from the fact that the capacity retention rate was 77% despite the cycle characteristics being comparatively satisfactory, presumably, there was some elution of manganese from the first active material particles.

Comparing Batteries A10 and A11 with Batteries A12 and A13, when the active material density in the positive electrode mixture layer was 3.3 g/cm$^3$, the cycle characteristics were satisfactory; whereas when 3.35 g/cm$^3$, the capacity retention rate was about 70%. This is presumably because the linear pressure in the roll pressing was increased to enable the active material density to increase, causing the first active material particles to partially be unable to withstand the pressure, and thus causing some elution of Mn from the particles. However, even when the positive electrode had a high density exceeding 3.3 g/cm$^3$, the effect of suppressing elution of manganese was obtained with stability.

Regarding Batteries B2 to B13, presumably, the active material particles in the positive electrode mixture layer broke due to the linear pressure applied to the layer when pressed. This is presumably because, when the layer was pressed, a large amount of friction was created among the active material particles therein, causing the packing ability of the active material to lower. If the particles of the spinel-type lithium-manganese composite oxide, i.e., the first active material, broke in such a manner, manganese would have easily been eluted from surfaces newly created by such breaking of the particles. This would have presumably reduced the effect of the lithium-nickel composite oxide, i.e., the second active material, in terms of suppressing elution of manganese.

Regarding Battery A16, elution of manganese from the spinel-type lithium-manganese composite oxide was suppressed by modifying the surface of the first active material particles with a boron compound. This enabled obtaining cycle characteristics more satisfactory compared to when using the first active material particles having a surface not modified with a boron compound.

On the other hand, the lithium-nickel composite oxide was able to be appropriately arranged such that it surrounded the spinel-type lithium-manganese composite oxide, i.e., the first active material, due to the proportion of the first active material particles included in the positive electrode active material being in the range of 51 vol % to 90 vol %; due to the volume-based particle size distribution of the first active material particles having the first peak and the second peak, the former being on the larger particle side and the latter being on the smaller particle side, and the first particle size $D_1$ corresponding to the first peak being 2.5 to 5.0 times larger than the second particle size $D_2$ corresponding to the second peak; and due to the volume-based particle size distribution of the second active material particles having the third peak corresponding to the third particle size $D_3$ which satisfies $D_1 > D_3 > D_2$. Thus, the positive electrode was able to be densely packed with the active material, and the lithium-nickel composite oxide was able to be supplemented with hydrogen ions from the non-aqueous electrolyte in the vicinity of the spinel-type lithium-manganese composite oxide. This enabled suppression of elution of manganese from the lithium-manganese composite oxide caused by hydrogen ions in the non-aqueous electrolyte, and enabled realization of a non-aqueous electrolyte second battery having excellent cycle characteristics and excellent high-temperature storage characteristics. Moreover, since the packing ability of the active material in the positive electrode mixture layer was able to be increased, high pressure was unnecessary when the positive electrode was pressed. Therefore, excessive pressure was not applied to the active material particles, and thus, the first active material particles did not break easily, and also, new surfaces were not created easily in the layer.

Effect due to control of the particle size distributions as above was observed, also in comparing Battery A14, in which Al was dissolved in the first active material for improving the properties of the spinel-type lithium-manganese composite oxide, with Batteries B10 and B11; and furthermore, in comparing Battery A15, in which Mg was dissolved in the first active material for improving the same, with Batteries B12 and B13.

For the above embodiment, a description was given of a cylindrical non-aqueous electrolyte secondary battery including a wound-type electrode assembly. However, the shape of the battery is not limited to that of a cylinder. The present invention can also be applied to, for example, a flat battery, a prismatic battery, and a laminated battery. The form of the electrode assembly is also not limited to being a wound-type, and may also be a stacked-type.

INDUSTRIAL APPLICABILITY

According to the present invention, even when a positive electrode active material mainly composed of a lithium-manganese composite oxide is used, elution of manganese can be suppressed while higher density of the positive electrode is realized, thus enabling realization of a non-aqueous electrolyte secondary battery having excellent charge-discharge cycle characteristics and excellent long-term durability. The present invention can be installed in large-size power supplies for backup and in vehicles such as a hybrid vehicle, an electric vehicle, and an electric forklift truck; and thus, can be applied in the fields of large-size batteries and high-capacity batteries, both configured for power systems such as a drive power supply for vehicles, etc.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

LIST OF REFERENCE NUMERALS 1 positive electrode plate
2 negative electrode plate
3 separator
4 electrode assembly
5 battery case
6 positive lead
7 negative lead
8 sealing plate
9 gasket
41, 51 first active material
42, 52 second active material

The invention claimed is:

1. A positive electrode for a non-aqueous electrolyte secondary battery, the positive electrode comprising: a positive electrode current collector; and a positive electrode mixture layer attached to the positive electrode current collector,
    the positive electrode mixture layer comprising a positive electrode active material including first active material particles and second active material particles,
    the first active material being a lithium-manganese composite oxide,
    the second active material being a lithium-nickel composite oxide,
    a proportion of the first active material particles included in the positive electrode active material being 51 vol % to 90 vol %, and a volume-based particle size distribution of the first active material particles having a first peak on a larger particle side and a second peak on a smaller particle side,
    a first particle size $D_1$ corresponding to the first peak on the larger particle side being 2.5 to 5 times larger than a second particle size $D_2$ corresponding to the second peak on the smaller particle side, and
    a volume-based particle size distribution of the second active material particles having a third peak corresponding to a third particle size $D_3$ satisfying $D_1 > D_3 > D_2$.

2. The positive electrode for a non-aqueous electrolyte secondary battery in accordance with claim 1,
    wherein the first active material particles comprise: a first particle group corresponding to the first peak; and a second particle group corresponding to the second peak, and
    a proportion of the first particle group included in the first active material particles is 60 vol % to 80 vol %.

3. The positive electrode for a non-aqueous electrolyte secondary battery in accordance with claim 1,
    wherein the lithium-manganese composite oxide is represented by the general formula: $LiMn_{2-x}M^1_xO_4$, where element $M^1$ is at least one selected from the group consisting of Al, Co, Ni, Mg, Fe, and B, and satisfies $0 \leq x \leq 0.6$.

4. The positive electrode for a non-aqueous electrolyte secondary battery in accordance with claim 1, wherein the lithium-nickel composite oxide is represented by the general formula: $LiNi_{1-y}M^2_yO_2$, where element $M^2$ is at least one selected from the group consisting of Co, Al, Mn, W, Ti, Nb, Ba, and B, and satisfies $0 \leq y < 0.5$.

5. A non-aqueous electrolyte secondary battery comprising: the positive electrode in accordance with claim 1; a negative electrode; and a non-aqueous electrolyte layer interposed between the positive and negative electrodes.

* * * * *